US012636948B1

(12) United States Patent
Pettey et al.

(10) Patent No.: US 12,636,948 B1
(45) Date of Patent: May 26, 2026

(54) TEAR RESISTANT FUEL CELLS FOR AIRCRAFT

(71) Applicant: Response Technologies, LLC, Coventry, RI (US)

(72) Inventors: David Allen Pettey, Portsmouth, RI (US); Edmund Francis Bard, Cumberland, RI (US)

(73) Assignee: Response Technologies, LLC, Coventry, RI (US)

( * ) Notice: Subject to any disclaimer, the term of this patent is extended or adjusted under 35 U.S.C. 154(b) by 0 days.

(21) Appl. No.: 19/053,169

(22) Filed: Feb. 13, 2025

(51) Int. Cl.
*B60K 15/03* (2006.01)
*B64D 27/31* (2024.01)

(52) U.S. Cl.
CPC ........ *B60K 15/03* (2013.01); *B60K 15/03006* (2013.01); *B64D 27/31* (2024.01); *B60K 2015/03032* (2013.01); *B60L 2200/10* (2013.01)

(58) Field of Classification Search
CPC .......... B65D 25/14; B60K 2015/03032; B60K 2015/03046; B60K 2015/03059; B60K 15/03; B60K 15/03006; B60K 15/03177; B64D 37/06; B64D 37/04; B32B 27/12
See application file for complete search history.

(56) References Cited

U.S. PATENT DOCUMENTS

| | | | | |
|---|---|---|---|---|
| 10,967,732 | B2 * | 4/2021 | Tanaka | B32B 27/12 |
| 12,257,819 | B1 * | 3/2025 | Kaiser | B32B 37/1284 |
| 2015/0274311 | A1 * | 10/2015 | Briand | B32B 27/065 220/560.01 |

* cited by examiner

*Primary Examiner* — Jeffrey R Allen
(74) *Attorney, Agent, or Firm* — Lawrence Youst PLLC

(57) ABSTRACT

A fuel cell for an aircraft includes a textile substrate having a plurality of unidirectional textile plies that are bonded together. An outer shell layer is positioned exteriorly of the textile substrate. The plurality of unidirectional textile plies includes first and second ripstop plies each having a yarn coupled thereto in a ripstop pattern. The ripstop pattern of the first ripstop ply has an off-axis orientation relative to the ripstop pattern of the second ripstop ply.

20 Claims, 12 Drawing Sheets

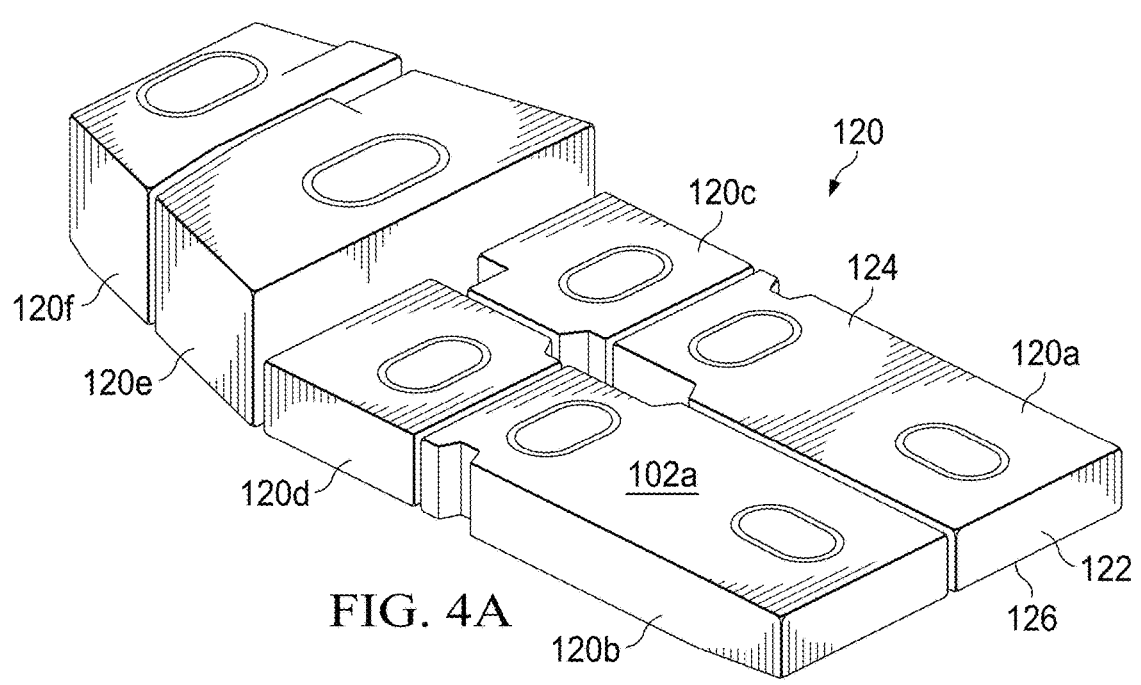
FIG. 4A
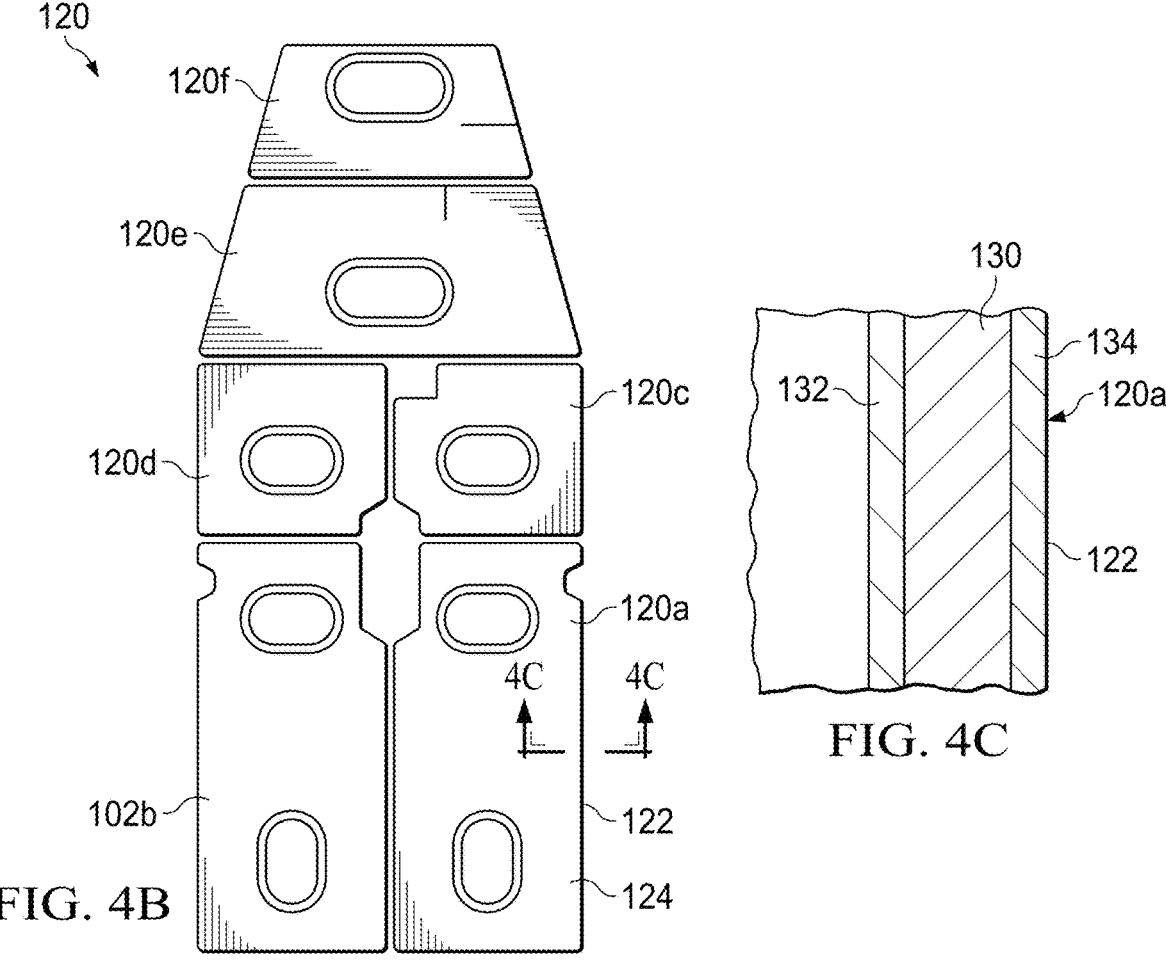
FIG. 4B
FIG. 4C

202
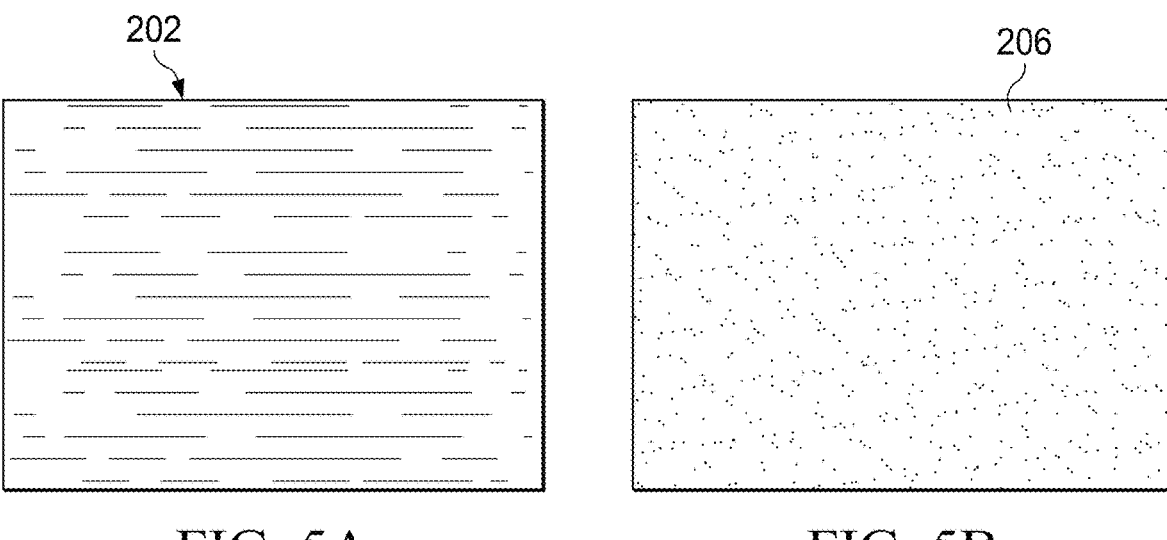
FIG. 5A
206
FIG. 5B
212
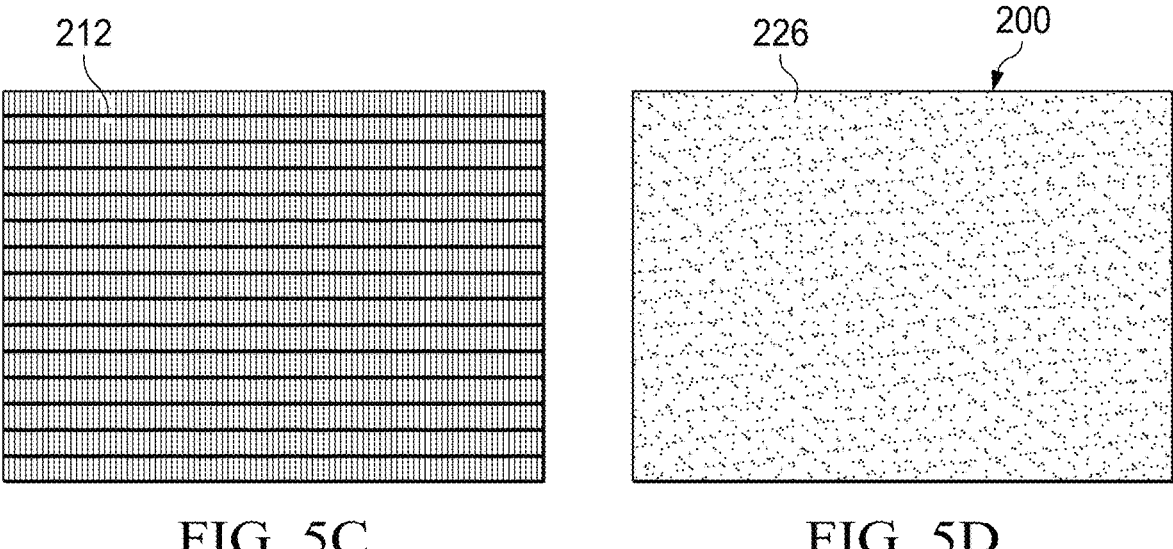
FIG. 5C
226 200
FIG. 5D

212

212b

212d

212f

212h

212j

212a

212c

212e

212g

212i

218

218a

218b

218c

218d

400

402 — PROVIDE A FUEL CELL MOLD

404 — APPLY A FUEL BARRIER LAYER ON THE FUEL CELL MOLD

406 — FORM A TEXTILE SUBSTRATE HAVING TWO OR MORE RIPSTOP PLIES ON THE FUEL CELL MOLD SUCH THAT THE RIPSTOP PATTERNS OF ADJACENT RIPSTOP PLIES HAVE AN OFF-AXIS ORIENTATION

408 — APPLY AN OUTER SHELL LAYER EXTERIORLY OF THE TEXTILE SUBSTRATE

410 — REMOVE THE FUEL CELL MOLD TO FORM THE FUEL CELL

TEAR RESISTANT FUEL CELLS FOR AIRCRAFT

TECHNICAL FIELD OF THE DISCLOSURE

The present disclosure relates, in general, to aircraft fuel cells that have enhanced tear resistance and, in particular, to crashworthy and ballistically tolerant fuel cells for aircraft that have tear resistant unidirectional textile plies incorporated into a textile substrate that increase the tear and puncture performance properties of the fuel cell.

BACKGROUND

The United States Department of Defense (DoD) promulgates numerous requirements in an effort to ensure that military aircraft meet the highest standards of performance and safety. For example, one of the DoD specifications outlines the requirements and verification testing for crashworthy, ballistic tolerant fuel cells used in aircraft. A key performance property detailed in this standard is the constant rate of tear, which measures the resistance of the fuel cell material to tearing under a constant load. The constant rate of tear test is conducted by applying a constant tensile load to a specimen of the fuel cell material and measuring the rate at which the specimen tears. The material must meet a minimum tear resistance to pass the test and confirm it can withstand the forces that may be encountered during a crash or a ballistic event.

Another section of this DoD specification outlines a drop test requirement that is used to determine whether the fuel cell can withstand the forces associated with a crash or hard landing. In the drop test, the fuel cell is filled with water and dropped from a specified height onto a non-deforming surface. During the drop test, the fuel cell must not rupture or leak any water. This requirement establishes whether the fuel cell can withstand impact forces without compromising its integrity. Both the constant rate of tear test and the drop test as well as additional tests including vibration, shock and ballistics tests are performed to demonstrate the safety and reliability of fuel cells used in military aircraft, as a failure in the material could lead to a fuel leak or an explosion. By satisfying the requirements specified by the DoD, fuel cell manufacturers ensure that their products provide the highest level of safety and performance for military personnel.

SUMMARY

In a first aspect, the present disclosure is directed to a fuel cell for an aircraft. The fuel cell includes a textile substrate having a plurality of unidirectional textile plies that are bonded together. An outer shell layer is positioned exteriorly of the textile substrate. The plurality of unidirectional textile plies includes first and second ripstop plies each having a yarn coupled thereto in a ripstop pattern. The ripstop pattern of the first ripstop ply has an off-axis orientation relative to the ripstop pattern of the second ripstop ply.

In some embodiments, the plurality of unidirectional textile plies may be between four and twenty unidirectional textile plies. In certain embodiments, the unidirectional textile plies may include ultra-high molecular weight polyethylene fibers. In other embodiments, the unidirectional textile plies may include para-aramid fibers. In some embodiments, the unidirectional textile plies may be unidirectional laminate plies. In such embodiments, each of the unidirectional laminate plies may include a plurality of layers of unidirectional material positioned in a cross-ply orientation. In certain embodiments, the outer shell layer may be formed from an elastomeric material. In some embodiments, a fuel barrier layer may be positioned interiorly of the textile substrate.

In certain embodiments, the yarn may be a high tenacity yarn such as a yarn including ultra-high molecular weight polyethylene fibers. In some embodiments, the ripstop pattern may be a parallel linear pattern. In certain embodiments, the yarn may be stitched onto a surface of each ripstop ply to form the ripstop pattern. In some embodiments, the ripstop pattern of the first ripstop ply has a cross-ply orientation relative to the ripstop pattern of the second ripstop ply. In certain embodiments, the first and second ripstop plies may be adjacent plies. In other embodiments, the first and second ripstop plies may be nonadjacent plies. In some embodiments, the plurality of unidirectional textile plies may include a plurality of ripstop plies in a range between two and ten ripstop plies including the first and second ripstop plies. In such embodiments, the ripstop plies may be distributed uniformly within the textile substrate. Alternatively, in such embodiments, the ripstop plies may be distributed nonuniformly within the textile substrate. For example, the ripstop plies may be biased toward an outboard portion of the textile substrate.

In a second aspect, the present disclosure is directed to an aircraft that includes an airframe with a fuel cell coupled to the airframe. The fuel cell includes a textile substrate having a plurality of unidirectional textile plies that are bonded together. An outer shell layer is positioned exteriorly of the textile substrate. The plurality of unidirectional textile plies includes first and second ripstop plies each having a yarn coupled thereto in a ripstop pattern. The ripstop pattern of the first ripstop ply has an off-axis orientation relative to the ripstop pattern of the second ripstop ply.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 4A-4C are various views of tear resistant fuel cells for a helicopter in accordance with embodiments of the present disclosure;

FIGS. 5A-5D are schematic illustrations of a manufacturing process for tear resistant fuel cells in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figures 1A, 1B:
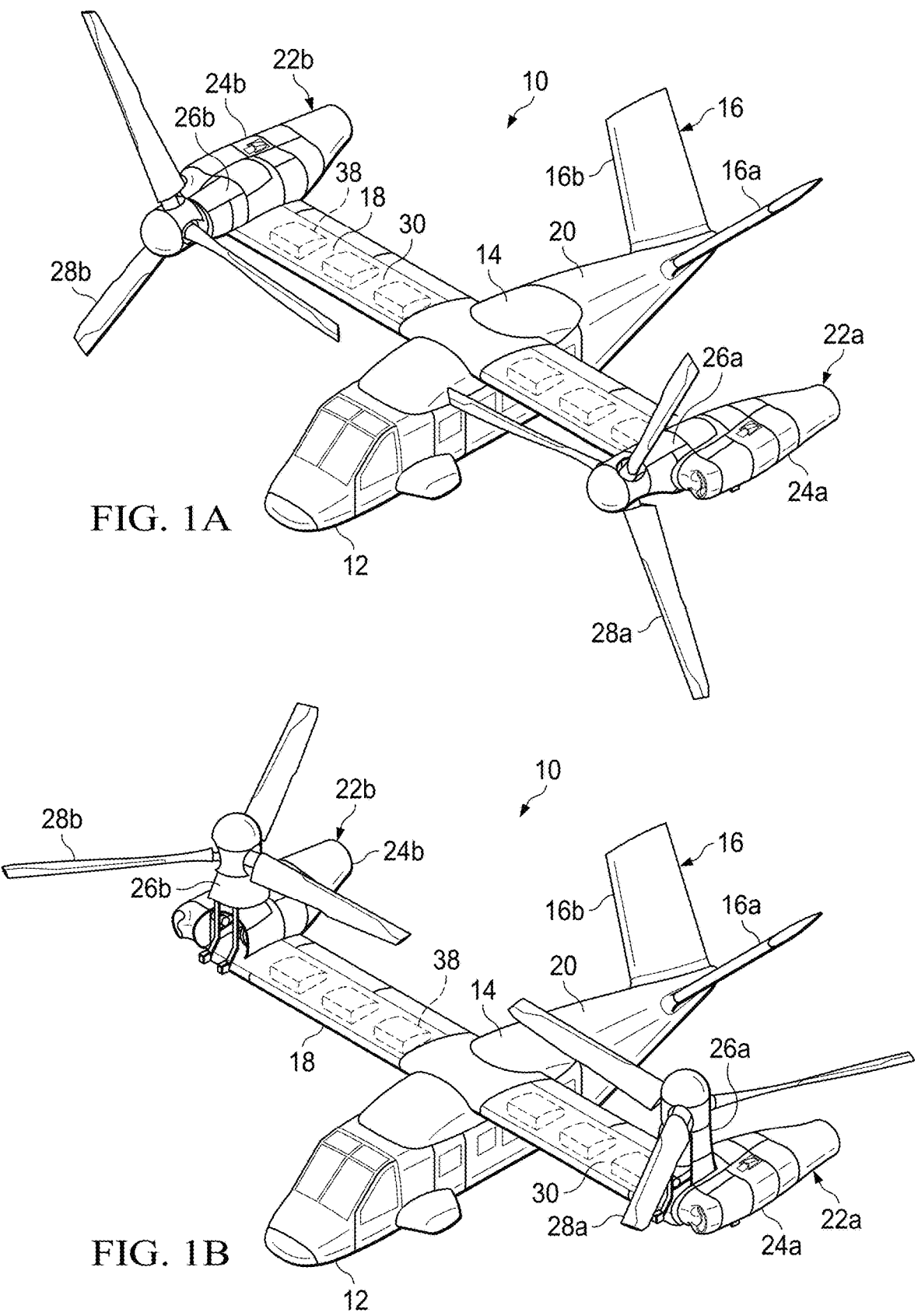
FIGS. 1A-1B are schematic illustrations of a tiltrotor aircraft that has tear resistant fuel cells in accordance with embodiments of the present disclosure.

Referring initially to FIGS. 1A-1B in the drawings, a tiltrotor aircraft is schematically illustrated and generally designated 10. Aircraft 10 includes a fuselage 12, a wing mount assembly 14 and a tail section 16 including tail members 16a, 16b having control surfaces operable for horizontal and/or vertical stabilization during forward flight. A wing 18 is supported by wing mount assembly 14 and is positioned generally above fuselage 12. Together, fuselage 12, tail assembly 16 and wing 18 as well as their various frames, longerons, stringers, bulkheads, spars, ribs, skins and the like form an airframe 20 of tiltrotor aircraft 10. Located at outboard ends of wing 18 are propulsion assemblies 22a, 22b. Propulsion assembly 22a includes a fixed nacelle 24a that houses an engine and a transmission. In addition, propulsion assembly 22a includes a pylon assembly bly 26a that is rotatable relative to fixed nacelle 24a between a generally horizontal orientation, as best seen in FIG. 1A, and a generally vertical orientation, as best seen in FIG. 1B. Propulsion assembly 22a also includes a proprotor assembly 28a that is rotatable relative to pylon assembly 26a responsive to torque and rotational energy provided by a drive system mechanically coupled to the engine and transmission housed by fixed nacelle 24a. Similarly, propulsion assembly 22b includes a fixed nacelle 24b that houses an engine and transmission, a pylon assembly 26b that is rotatable relative to fixed nacelle 24b and a proprotor assembly 28b that is rotatable relative to pylon assembly 26b responsive to torque and rotational energy provided by a drive system mechanically coupled to the engine and transmission housed by fixed nacelle 24b.

FIG. 1A illustrates aircraft 10 in airplane or forward flight mode, in which proprotor assemblies 28a, 28b are rotating in a substantially vertical plane to provide a forward thrust enabling wing 18 to provide a lifting force responsive to forward airspeed, such that aircraft 10 flies much like a conventional propeller driven aircraft. FIG. 1B illustrates aircraft 10 in helicopter or vertical takeoff and landing (VTOL) flight mode, in which proprotor assemblies 28a, 28b are rotating in a substantially horizontal plane to provide a lifting thrust, such that aircraft 10 flies much like a conventional helicopter. It should be appreciated that aircraft 10 can be operated such that proprotor assemblies 28a, 28b are selectively positioned between forward flight mode and VTOL flight mode, which can be referred to as a conversion flight mode. Even though aircraft 10 has been described as having one engine in each fixed nacelle 24a, 24b, it should be appreciated by those having ordinary skill in the art that other engine arrangements are possible and are considered to be within the scope of the present disclosure including, for example, alternatively or additionally having one or more engines housed within fuselage 12 that provides torque and rotational energy to both proprotor assemblies 28a, 28b.

Referring additionally to FIGS. 2A-2D in the drawings, wing 18 is supported by wing airframe 20a, which includes wing skin 30 and internal support structure such as ribs 32 and spars 34. In the illustrated embodiment, wing airframe 20a forms multiple fuel cell compartments 36a, 36b, 36c that respectively receive fuel cells 38a, 38b, 38c therein. For convenience of discussion, the fuels cells of aircraft 10 may collectively and/or individually be referred to herein as fuel cells 38. Previous types of fuel cells such as rigid fuel tanks are difficult to install and service in tight fuel cell compartments such as fuel cell compartment 36a, 36b, 36c, and are highly susceptible to damage during installation, maintenance and removal processes, which may lead to fuel leaks, premature failure or other hazards. To address the need for fuel cells that are easier to install and service in tight fuel cell compartments while still meeting performance requirements, aircraft 10 includes crashworthy, ballistically tolerant and flexible fuel cells 38. Fuel cells 38 may also be referred to as fuel bladders, fuel bags or fuel tanks.

For military applications, the DoD has certain requirements and verification testing for crashworthy, ballistic tolerant fuel cells used in aircraft. One standard relates to the constant rate of tear of fuel cell materials under a constant load. The constant rate of tear test is conducted by applying a constant tensile load to a specimen of the fuel cell material and measuring the rate at which the specimen tears. The material must meet a minimum tear resistance to pass the test and confirm it can withstand the forces that may be encountered during a crash or a ballistic event. Another DoD standard requires a drop test which is used to determine whether the fuel cell can withstand the forces associated with a crash or hard landing. In the drop test, the fuel cell is filled with water and dropped from a specified height onto a non-deforming surface. During the drop test, the fuel cell must not rupture or leak any water. This requirement establishes whether the fuel cell can withstand the impact forces of a crash without compromising its integrity. Fuel cells 38 are designed to meet these and other military standards as well as commercial aircraft standards based upon the material properties of fuel cells 38 including, for example, the tear performance properties and the puncture performance properties of fuel cells 38.

Figures 2A, 2B, 2C, 2D:
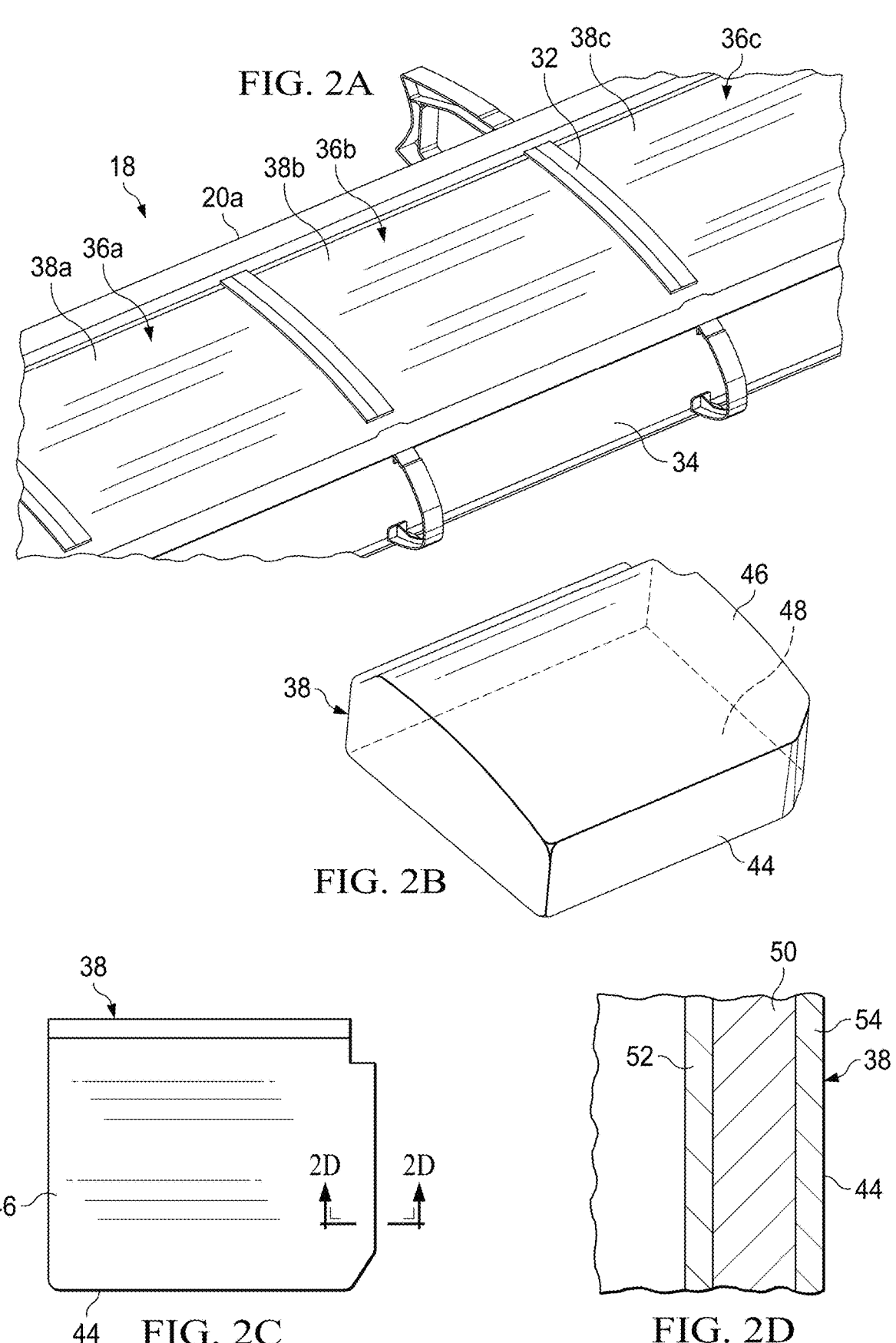
FIGS. 2A-2D are various views of a tear resistant fuel cell for a tiltrotor aircraft in accordance with embodiments of the present disclosure.

As best seen in FIG. 2B, fuel cell 38 includes a plurality of side wall depicted as lateral walls 44, a top wall 46 and a bottom wall 48. As best seen in FIG. 2D, which is a cross section taken along line 2D-2D in FIG. 2C, fuel cell 38 includes a textile substrate 50, a fuel barrier layer 52 positioned interiorly of textile substrate 50 and an outer shell layer 54 positioned exteriorly of textile substrate 50. Fuel barrier layer 52 may be formed of any material that is chemically resistant and essentially inert to the type of fuel that fuel cell 38 is configured to contain. For example, fuel barrier layer 52 may be formed from a thermoplastic fluoropolymer such as a polyvinylidene fluoride or a polyvinylidene difluoride. Fuel barrier layer 52 may have a thickness of between 0.002 inches and 0.005 inches such as approximately 0.003 inches. In some embodiments, fuel barrier layer 52 may be imparted with electrostatic discharge properties that mitigate the chances of triggering an electrostatic discharge ignition. Fuel barrier layer 52 may also include one or more elastomeric film layers that serve as secondary fuel tolerant layers. The elastomeric film may be between 10 mils and 100 mils in thickness and may be formed from a polyurethane, a polyurea, synthetic rubbers or other elastomers. Outer shell layer 54 may be applied to the exterior surface of textile substrate 50 to add rigidity and durability to fuel cell 38. Outer shell layer 54 may be formed from an elastomeric material such a polyurea.

Textile substrate 50 is formed from multiple unidirectional textile plies that are additively laid up to form textile substrate 50. In certain embodiments, textile substrate 50 may consist of between four and twenty unidirectional textile plies. In other embodiments, textile substrate 50 may consist of less than four unidirectional textile plies or greater than twenty unidirectional textile plies. The unidirectional textile plies may be formed from high performance fibers including ultra-high molecular weight polyethylene fibers such as Dyneema, para-aramid fibers such as Kevlar or combinations of high performance fibers. The unidirectional textile plies may also be referred to herein as unidirectional laminate plies as the unidirectional textile plies typically include multiple layers of high performance fibers laminated together using liquid resins or film adhesives. The use of high performance fibers in the unidirectional textile plies creates a lightweight material with high tensile strength that is resistant to ballistic impacts. As the ballistic performance and failure characteristics of various high performance fibers are different, it may be desirable to form a hybrid textile substrate that includes more than one type of high performance fiber. For example, it may be desirable to place one or more unidirectional laminate plies that have para-aramid fibers as the outboard plies together with one or more unidirectional laminate plies that have ultra-high molecular weight polyethylene fibers as the inboard plies. This arrangement has the benefit of a higher melting point material as the outer plies together with a higher energy absorption material as the inner plies.

It has been found that unidirectional laminate plies formed from high performance fibers may lack sufficient tear resistance to meet certain DoD specifications such as the constant rate of tear requirement and/or the drop test requirement. To overcome this shortcoming, certain of the unidirectional laminate plies in textile substrate 50 are reinforced with a high tenacity yarn in a ripstop pattern that prevents ruptures or tears in a unidirectional laminate ply from spreading beyond the original damage. These ripstop plies have improved tear resistance compared to standard unidirectional laminate plies. By including two or more ripstop plies in an off-axis orientation relative to one another within textile substrate 50, the tear resistance of textile substrate 50 is improved.

It should be appreciated that aircraft 10 is merely illustrative of a variety of aircraft that can implement the embodiments disclosed herein. Indeed, fuel cells 38 may be implemented on any aircraft that requires fuel. Other aircraft implementations can include helicopters, hybrid aircraft, tiltwing aircraft, quad tiltrotor aircraft, unmanned aircraft, gyrocopters, fixed wing airplanes, compound helicopters, jets, drones and the like. As such, those skilled in the art will recognize that fuel cells 38 can be integrated into a variety of aircraft configurations. It should be appreciated that even though aircraft are particularly well-suited to implement the embodiments of the present disclosure, non-aircraft vehicles and devices such as land or water vehicles can also implement the embodiments. In addition, even though fuel cells 38 have been depicted and described as been positioned within fuel cell compartments of an aircraft, it should be understood by those having ordinary skill in the art that the fuel cells of the present disclosure are equally well-suited for use as auxiliary fuel cells that may be mounted to the interior or the exterior of an aircraft.

Figures 3A, 3B:
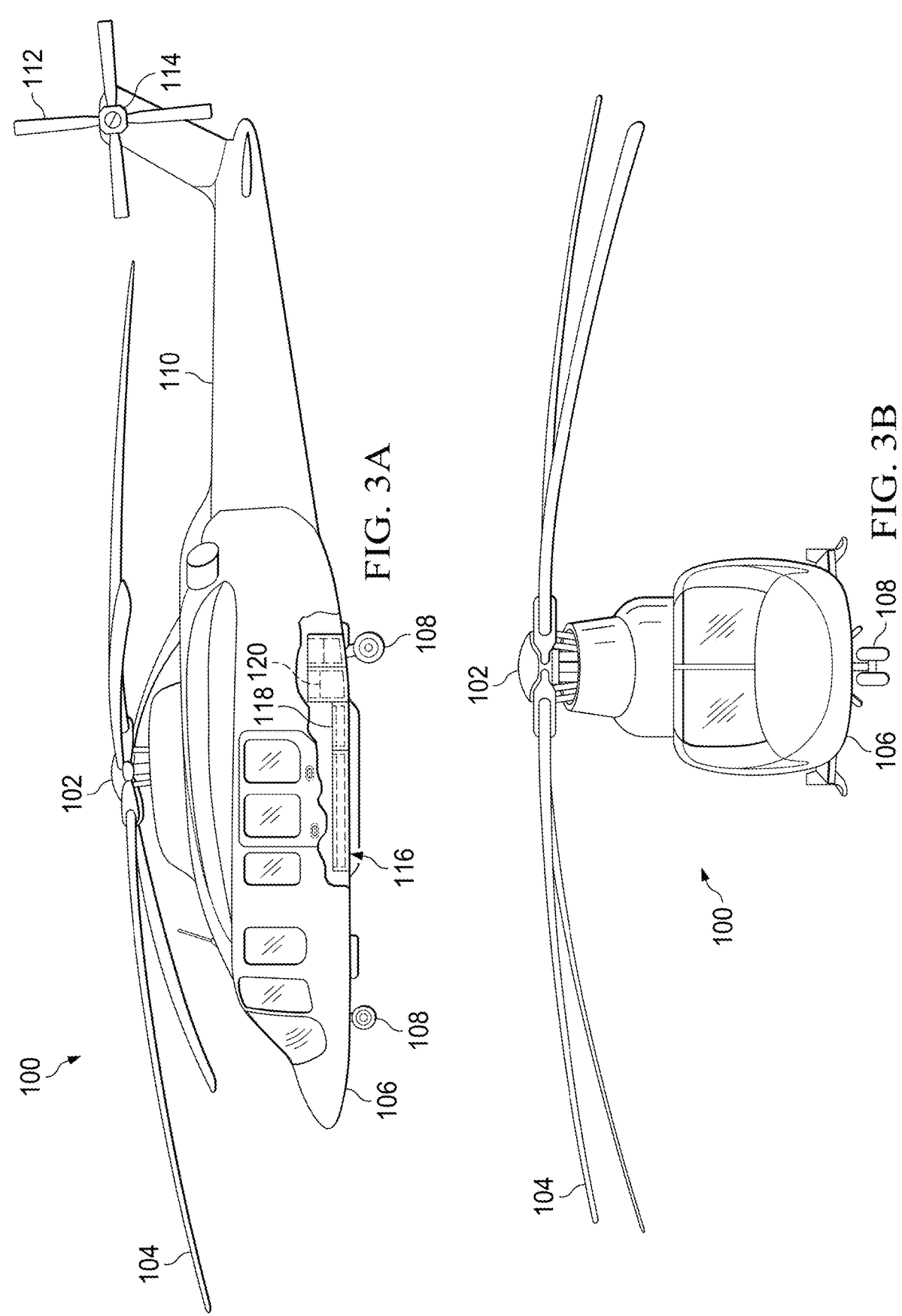
FIGS. 3A-3B are schematic illustrations of a helicopter that has tear resistant fuel cells in accordance with embodiments of the present disclosure.

For example, referring to FIGS. 3A-3B in the drawings, a helicopter is schematically illustrated and generally designated 100. Helicopter 100 has a rotor hub assembly 102, which includes a plurality of rotor blade assemblies 104. Rotor hub assembly 102 is rotatable relative to a fuselage 106 of helicopter 100. The pitch of rotor blade assemblies 104 can be collectively and/or cyclically manipulated to selectively control direction, thrust and lift of helicopter 100. A landing gear system 108 provides ground support for helicopter 100. A tailboom 110 extends from fuselage 106. A tail rotor 112 includes a tail rotor hub assembly 114 that is rotatably coupled to the aft portion of tailboom 110. Helicopter 100 has a fuel system 116 including a fuel cell compartment 118 located in a lower portion of fuselage 106. Fuel cell compartment 118 is coupled to fuselage 106 and may be fully or partially integral with fuselage 106 or may be independent of but secured to fuselage 106. In other aircraft configurations, fuel cell compartment 118 may be located elsewhere in fuselage 106. Fuel cell compartment 118 contains a fuel tank 120. The fuel contained in fuel tank 120 is used as an energy source to power the various systems of helicopter 100 such as rotor hub assembly 102 and tail rotor hub assembly 114.

As best seen in FIGS. 4A-4C, fuel tank 120 include six interconnected fuel cells including forward fuel cells 120a, 120b, feed fuel cells 120c, 120d, mid fuel cell 120e and aft fuel cell 120f. As illustrated, the height of mid fuel cell 120e and aft fuel cell 120f is greater than that of forward fuel cells 120a, 120b and feed fuel cells 120c, 120d. The volume of fuel that may be stored in fuel tank 120 will depend on the particular implementation but will typically be on the order of several hundred to a thousand gallons. For sake of efficiency, certain features will be disclosed only with regard to fuel cell 120*a*. One having ordinary skill in the art, however, will fully appreciate an understanding of fuel cells 120*b*-120*f* based upon the disclosure herein of fuel cell 120*a*. Fuel cell 120*a* includes lateral walls 122, a top wall 124 and a bottom wall 126. In the illustrated embodiment, fuel cell 120*a* includes a textile substrate 130, a fuel barrier layer 132 positioned interiorly of textile substrate 120 and an outer shell layer 134 positioned exteriorly of textile substrate 120. Fuel barrier layer 132 is substantially similar to fuel barrier layer 52 discussed herein and may be formed from a thermoplastic fluoropolymer together with optional elastomeric film layers. Outer shell layer 134 is substantially similar to outer shell layer 54 and may formed from an elastomeric material such a polyurea. Textile substrate 130 is substantially similar to textile substrate 50 and may be formed from multiple unidirectional textile plies including two or more ripstop plies in an off-axis orientation relative to one another that are additively laid up to form textile substrate 50.

Figure 6A:
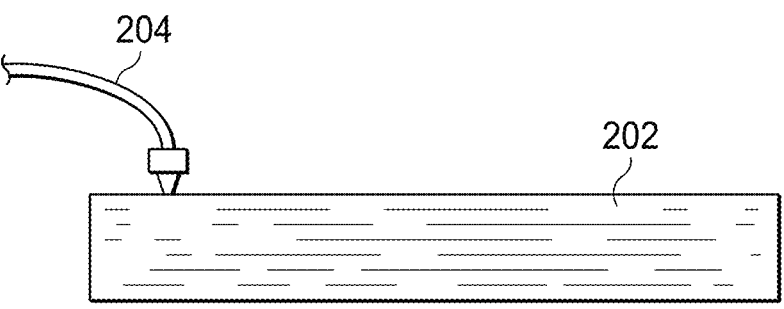
FIGS. 6A-6D are schematic illustrations of manufacturing steps for tear resistant fuel cells in accordance with embodiments of the present disclosure.

Referring to FIGS. 5A-5D in the drawings, a manufacturing process for the production of a tear resistant fuel cell 200 is depicted. While the manufacturing process is shown to have a particular sequence of steps, it will be appreciated that the steps shown therein may occur out of the illustrated or described order depending on the embodiment and/or application. In other embodiments, one or more illustrated or described steps may be omitted. For ease of reference, fuel cell 200 is shown to have a test cube shape, although fuel cell 200 may be manufactured in wide variety of shapes. As shown in FIG. 5A, the manufacturing process begins with a fuel cell mold 202 that acts as the surface upon which fuel cell 200 may be layered, after which fuel cell mold 202 is removed or destroyed. Thus, fuel cell mold 202 is not part of the finished fuel cell 200 that is installed in an aircraft. Fuel cell mold 202 may be manufactured using a wide variety of additive, subtractive or formative manufacturing techniques including, but not limited to, extrusion, machining, 3D printing, stamping, welding or casting as well as others. Referring additionally to FIG. 6A in the drawings, in the illustrated embodiment, fuel cell mold 202 is being 3D printed by a 3D printer 204. Fuel cell mold 202 may be 3D printed using polylactic acid, acrylonitrile butadiene styrene, Nylon or a wide variety of other 3D printable materials using a range of different 3D printing technologies such as fused deposition modeling or stereolithography. In some embodiments, a plurality of fuel cell mold segments may be 3D printed and subsequently assembled to form fuel cell mold 202. For example, fuel cell mold 202 may be 3D printed as two cupped halves joined together to form fuel cell mold 202, thereby avoiding the need for struts or other internal supports. The ability to form fuel cell mold 202 from fuel cell mold segments may also help to remove fuel cell mold 202 from fuel cell 200 after fuel cell 200 is completed.

Figure 6B:
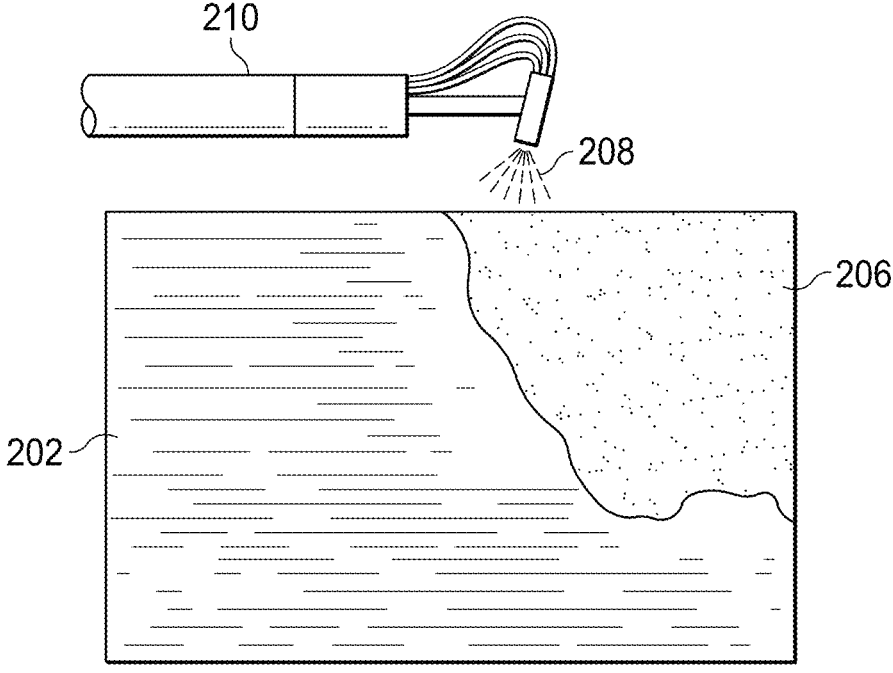

Referring to FIG. 5B in the drawings, a fuel barrier layer 206 may be applied to the outer surface of fuel cell mold 202. Referring additionally to FIG. 6B in the drawings, fuel barrier layer 206 may be spray coated on fuel cell mold 202. In the illustrated embodiment, the fuel barrier material 208 is in the process of being robotically spray coated on fuel cell mold 202 by a spray coating machine 210, although in other embodiments fuel barrier material 208 may be manually applied on fuel cell mold 202 by brushing or other suitable technique. Fuel barrier material 208 is preferably applied in a uniform thickness over the entirety of fuel cell mold 202 to form fuel barrier layer 206. In some embodiments, a mold release agent may be applied to fuel cell mold 202 prior to applying fuel barrier layer 206.

Figure 6C:
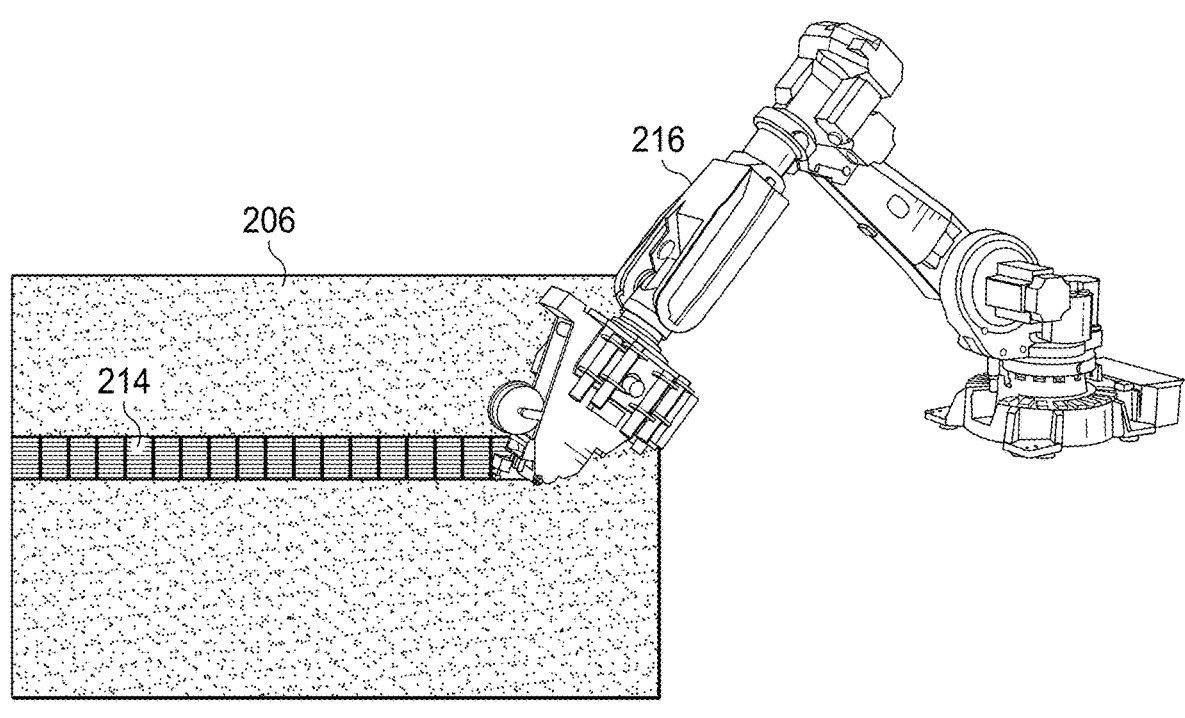

Referring to FIG. 5C in the drawings, after fuel barrier layer 206 has been applied to fuel cell mold 202, multiple unidirectional textile plies are additively laid up to form textile substrate 212. An elastomeric adhesive may be applied to fuel barrier layer 206 prior to forming textile substrate 212 thereon. In some embodiments, fuel cell mold 202 has a geometry that enables a broadcloth construction process requiring only a single layup and a single cure. The broadcloth unidirectional textile plies may be placed on fuel cell mold 202 using a manual or automated layup process, applying a resin, such as an elastomer adhesive, between each of the unidirectional textile plies. The weight ratio of the unidirectional textile material to the resin can range from 20 percent textile and 80 percent resin to 70 percent textile and 30 percent resin, although other ratios are within the scope of the illustrative embodiments. Higher textile content can provide enhanced strength and stiffness. The use of composite materials provides the ability to tailor the combination of textile and resin to meet design requirements of fuel cell 200 such as stiffness and/or flexibility. Even though a particular method of manufacture and particular materials have been described herein, it should be understood by those having ordinary skill in the art that other methods of manufacture and other materials could alternatively or additionally be used to produce textile substrate 212. For example, referring additionally to FIG. 6C in the drawings, strips of unidirectional textile material, such as material strip 214 is being robotically laid up over fuel barrier layer 206. Robot 216 may be programmed to lay up the material strips in a more consistent pattern than what could otherwise be accomplished manually. In some embodiments, robot 216 may apply both the elastomer adhesive and the material strips using a co-application technique.

Figure 7A:
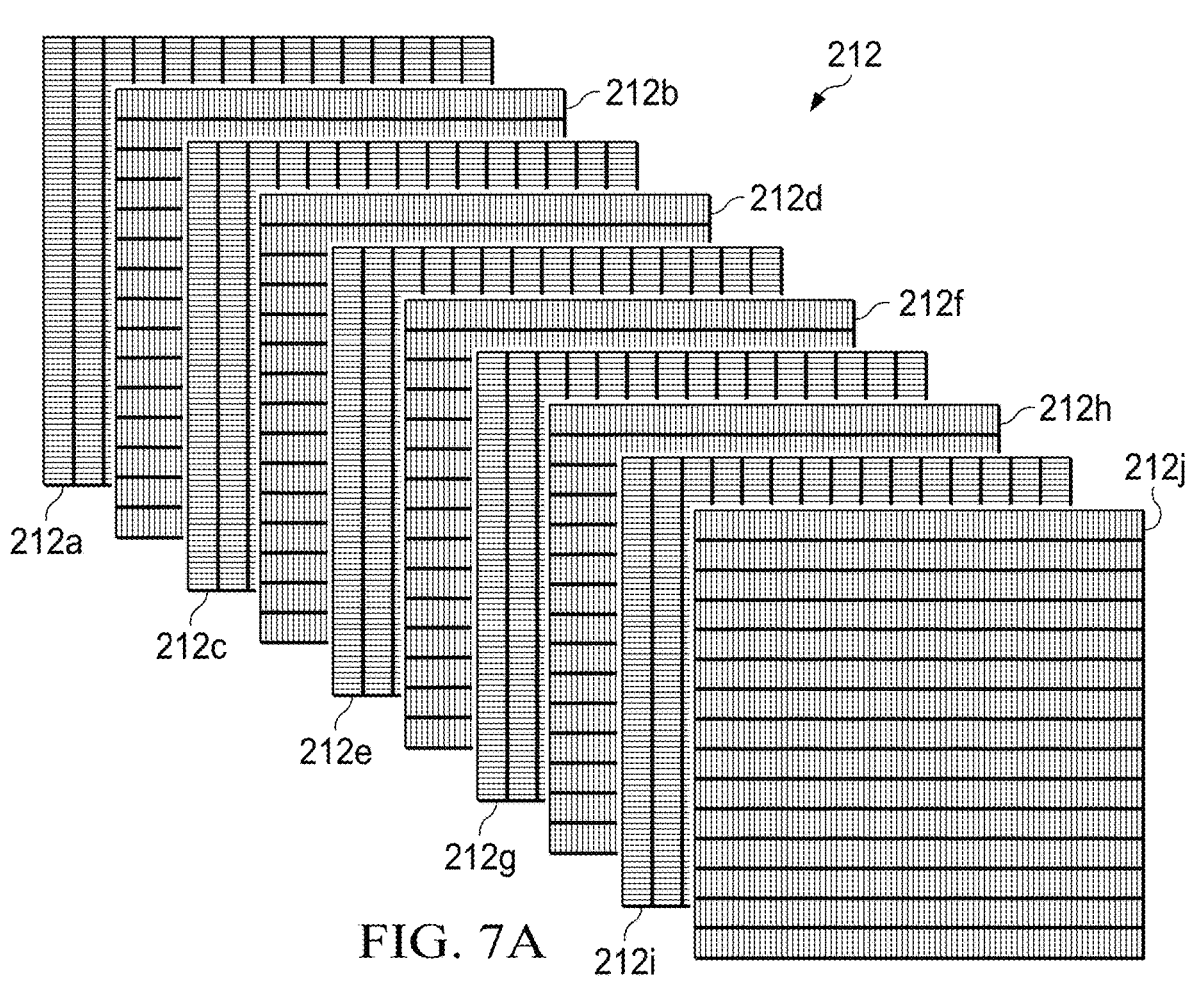
FIG. 7A is an exploded view of a textile substrate including a plurality of ripstop plies for use in tear resistant fuel cells in accordance with embodiments of the present disclosure.

In one example, textile substrate 212 may be formed using a layup process including a plurality of ripstop plies in the form of unidirectional laminate plies that have been reinforced with a high tenacity yarn in a ripstop pattern. Referring additionally to FIG. 7A in the drawings, an exploded or layup view of textile substrate 212 reveals a series of ripstop plies 212*a*-212*j* that have an off-axis orientation and more particularly a cross ply orientation (0°/90°). Orienting adjacent ripstop plies in an off-axis orientation allows textile substrate 212 to meet design requirements relating to tear resistance in all directions. As used herein, the term "adjacent ripstop plies" means first and second ripstop plies that do not have another ripstop ply therebetween but could have one or more non-ripstop plies therebetween. Also, as used herein, the term "adjacent plies" means first and second plies that do not have another ply therebetween. Even though textile substrate 212 is described and depicted as having ripstop plies 212*a*-212*j* in a cross ply orientation, it should be understood by those having ordinary skill in the art that a textile substrate could have ripstop plies in other off-axis orientations including, but not limited to 0°/90°/45°/−45°, 0°/45°/90°/−45°, 0°/−45°/45°/90°, 60°/15/−75/−30°, 0°/60°/120° or other suitable off-axis orientation. In the illustrated embodiment, textile substrate 212 consists of ten ripstop plies 212*a*-212*j* that are uniformly distributed within textile substrate 212 with no non-ripstop plies included.

Figure 7B:
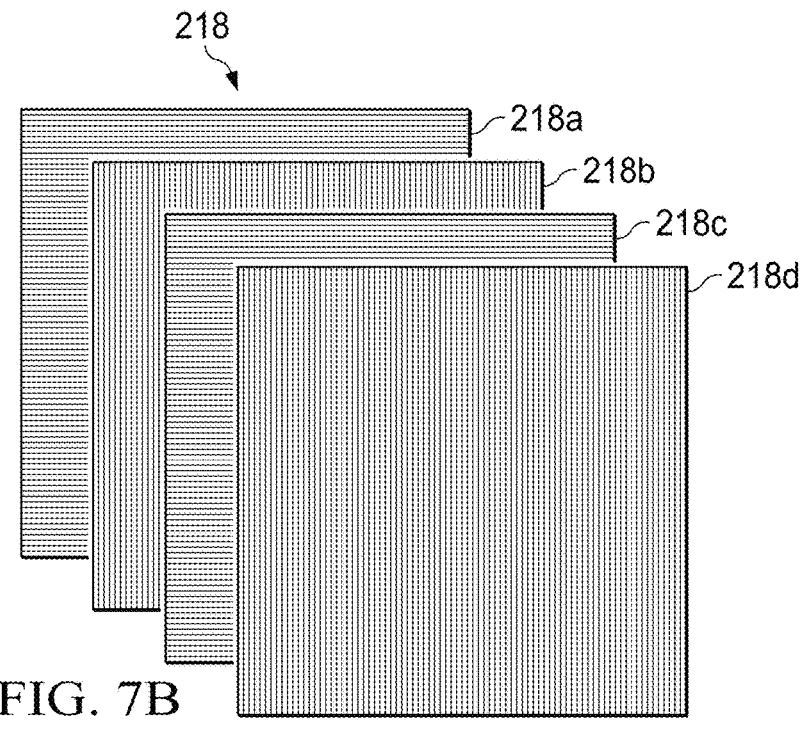
FIG. 7B is an exploded view of a unidirectional laminate ply including a plurality of unidirectional material layers in a cross ply orientation for use in tear resistant fuel cells in accordance with embodiments of the present disclosure.
Figure 7C:
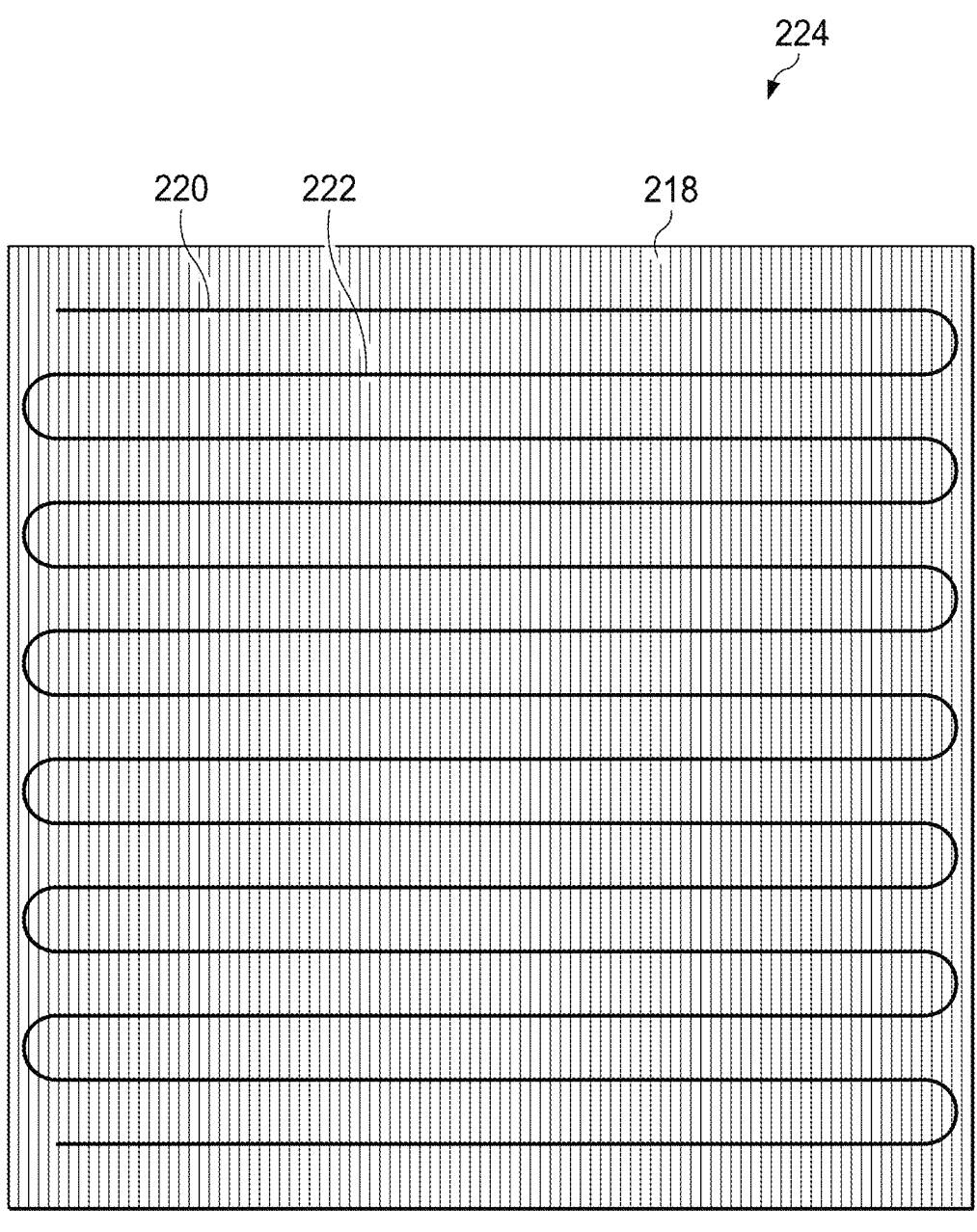
FIG. 7C is a plan view of a ripstop ply formed from a unidirectional laminate ply with a high tenacity yarn coupled thereto in a ripstop pattern for use in tear resistant fuel cells in accordance with embodiments of the present disclosure.

As described herein, each ripstop ply 212*a*-212*j* is formed from a unidirectional laminate that has been reinforced with a high tenacity yarn in a ripstop pattern. Referring additionally to FIG. 7B in the drawings, an exploded view of a unidirectional laminate 218 reveals a series of unidirectional fiber layers 218*a*-218*d*, in this case four layers, which have an off-axis orientation and more particularly a cross ply orientation (0°/90°). Unidirectional fiber layers 218*a*-218*d* are encapsulated together in an elastomeric resin to form unidirectional laminate 218. Thereafter, the reinforcing high tenacity yarn may be coupled to one or both faces of unidirectional laminate 218. Referring additionally to FIG. 7C in the drawings, a high tenacity yarn 220 has been stitched onto one of the faces of unidirectional laminate 218 using, for example, an embroidering process. In the illustrated embodiment, yarn 220 is stitched onto unidirectional laminate 218 in a ripstop pattern 222 depicted as a linear pattern and more particularly as a parallel linear pattern. In other embodiments, a ripstop pattern on a unidirectional laminate could have other configurations such as a grid pattern of squares, rectangles, diamonds or other suitable shapes. In the illustrated embodiment, the weight of yarn 220 may be between 500 denier and 3000 denier such as about 2000 denier. In other embodiments, yarn 220 may have a weight of less than 500 denier or greater than 2500 denier. In the illustrated embodiment, the distance between the parallel yarn lines may be between 0.25 inches and 1.5 inches such as about 0.75 inches. In other embodiments, the distance between the parallel yarn lines may be less than 0.25 inches or greater than 1.5 inches. Once yarn 220 has been stitched onto unidirectional laminate 218, this yields a unidirectional ripstop laminate 224 that may be cut to the required sizes and shapes to form ripstop plies 212*a*-212*j*.

Referring again FIG. 5C in the drawings, following the layup of ripstop plies 212*a*-212*j* and the elastomeric resin, the layup may be compacted or debulked to remove any pockets of air and to provide adequate attachment therebetween. The compacting step can be achieved by applying a vacuum to the layup in the mold, by pressurization or by pressing a second mold member or roller on the layup. Compacting not only consolidates the layup but also removes air trapped in the resin matrix that could otherwise create undesirable voids in textile substrate 212. After compacting, the layup may be cured to form textile substrate 212 using heat, pressure and/or time. For example, fuel cell mold 202 may be inserted into an autoclave and cured at elevated temperature and pressure for a predetermined time period. Following the curing process, textile substrate 212 may be trimmed or otherwise machined as desired. After curing, the ripstop plies 212*a*-212*j* and the elastomeric resin now form a high strength, lightweight, tear and puncture resistant textile substrate 212.

Figure 6D:
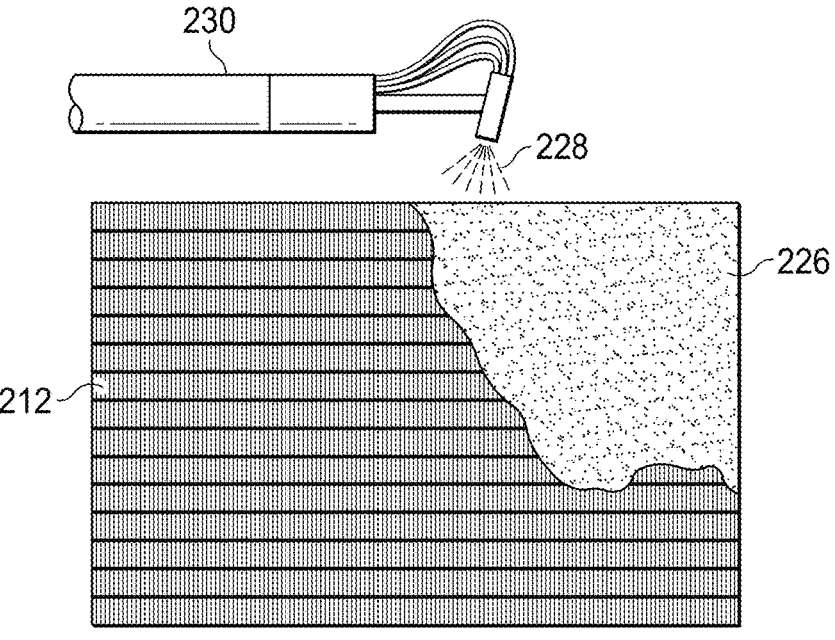

Referring to FIG. 5D in the drawings, an outer shell layer 226 is applied on textile substrate 212. Outer shell layer 226 is formed from an elastomeric material with sufficient elasticity to enable fuel cell 200 to have desired flexibility without forming cracks or other structural discontinuities therein. Referring additionally to FIG. 6D in the drawings, outer shell layer 226 may be spray coated on textile substrate 212. In the illustrated embodiment, elastomeric material 228 is in the process of being robotically spray coated on textile substrate 212 by a spray coating machine 230, although in other embodiments elastomeric material 228 may be manually applied on textile substrate 212. Outer shell layer 226 may be applied so as to have a uniform thickness and material composition over the entirety of textile substrate 212. In some embodiments, additional layers may be applied on top of outer shell layer 226 so that outer shell layer 226 is no longer the outermost layer of fuel cell 200. In certain embodiments, one or more additional material layers may be interposed between textile substrate 212 and outer shell layer 226. Upon completion of outer shell layer 226, fuel cell mold 202 is removed from the interior of fuel cell 200. Removing fuel cell mold 202 from fuel cell 200 may involve dismantled fuel cell mold 202 for future or repeat use or destructively removed fuel cell mold 202 for a one-time use. After removing fuel cell mold 202, fuel barrier layer 206, textile substrate 212 and outer shell layer 226 now form a crashworthy, ballistically tolerant, tear resistant fuel cell 200.

Figure 8A:
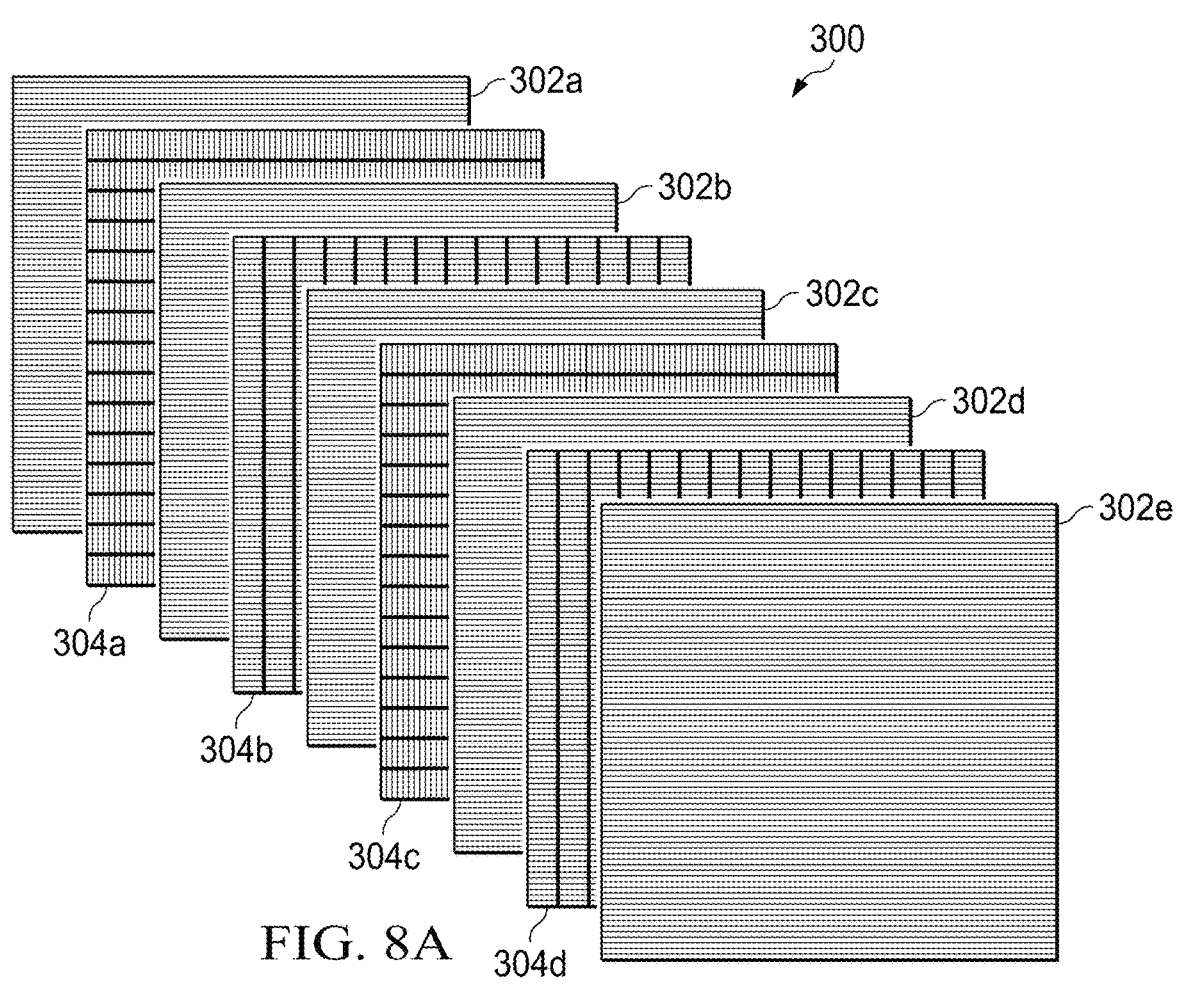
FIGS. 8A-8C are exploded views of textile substrates including ripstop plies in various configurations for use in tear resistant fuel cells in accordance with embodiments of the present disclosure.

Even though textile substrate 212 has been depicted and described as having exclusively ripstop plies, in other embodiments, a textile substrate of the present disclosure may consist of a combination of ripstop plies and non-ripstop plies. In fact, a textile substrate of the present disclosure may have ripstop plies and non-ripstop plies in any desired arrangement. For example, referring to FIG. 8A in the drawings, an exploded or layup view of a textile substrate 300 is depicted. Textile substrate 300 includes a series of non-ripstop plies 302*a*, 302*b*, 302*c*, 302*d*, 302*e* with a series of ripstop plies 304*a*, 304*b*, 304*c*, 304*d* interspersed therebetween. In the illustrated embodiment, ripstop plies 304*a*, 304*b*, 304*c*, 304*d* are nonadjacent adjacent plies with adjacent ripstop plies having an off-axis orientation and more particularly a cross ply orientation. Ripstop plies 304*a*, 304*b*, 304*c*, 304*d* are uniformly distributed within textile substrate 300 and have a 4:5 ratio relative to non-ripstop plies 302*a*, 302*b*, 302*c*, 302*d*, 302*e*.

Figure 8B:
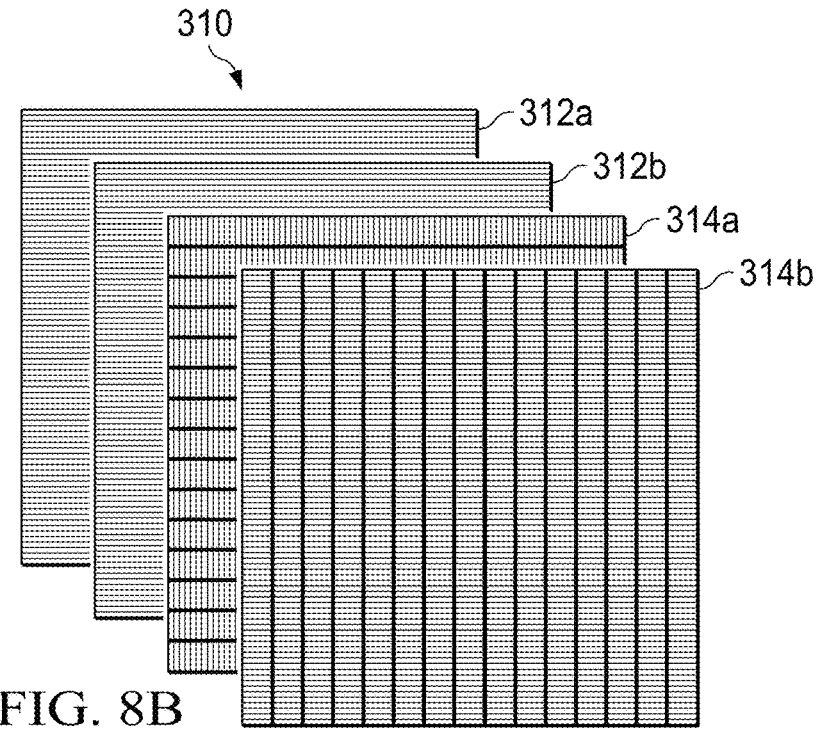

In another example, referring to FIG. 8B in the drawings, an exploded or layup view of a textile substrate 310 is depicted. Textile substrate 310 includes a series of non-ripstop plies 312*a*, 312*b* with a series of ripstop plies 314*a*, 314*b* positioned exteriorly thereof. In the illustrated embodiment, ripstop plies 314*a*, 314*b* are adjacent plies that have an off-axis orientation and more particularly a cross ply orientation. Ripstop plies are nonuniformly distributed within textile substrate 310 and are biased toward the outboard portion of textile substrate 310. Ripstop plies 314*a*, 314*b* have a 1:1 ratio with non-ripstop plies 312*a*, 312*b*.

Figure 8C:
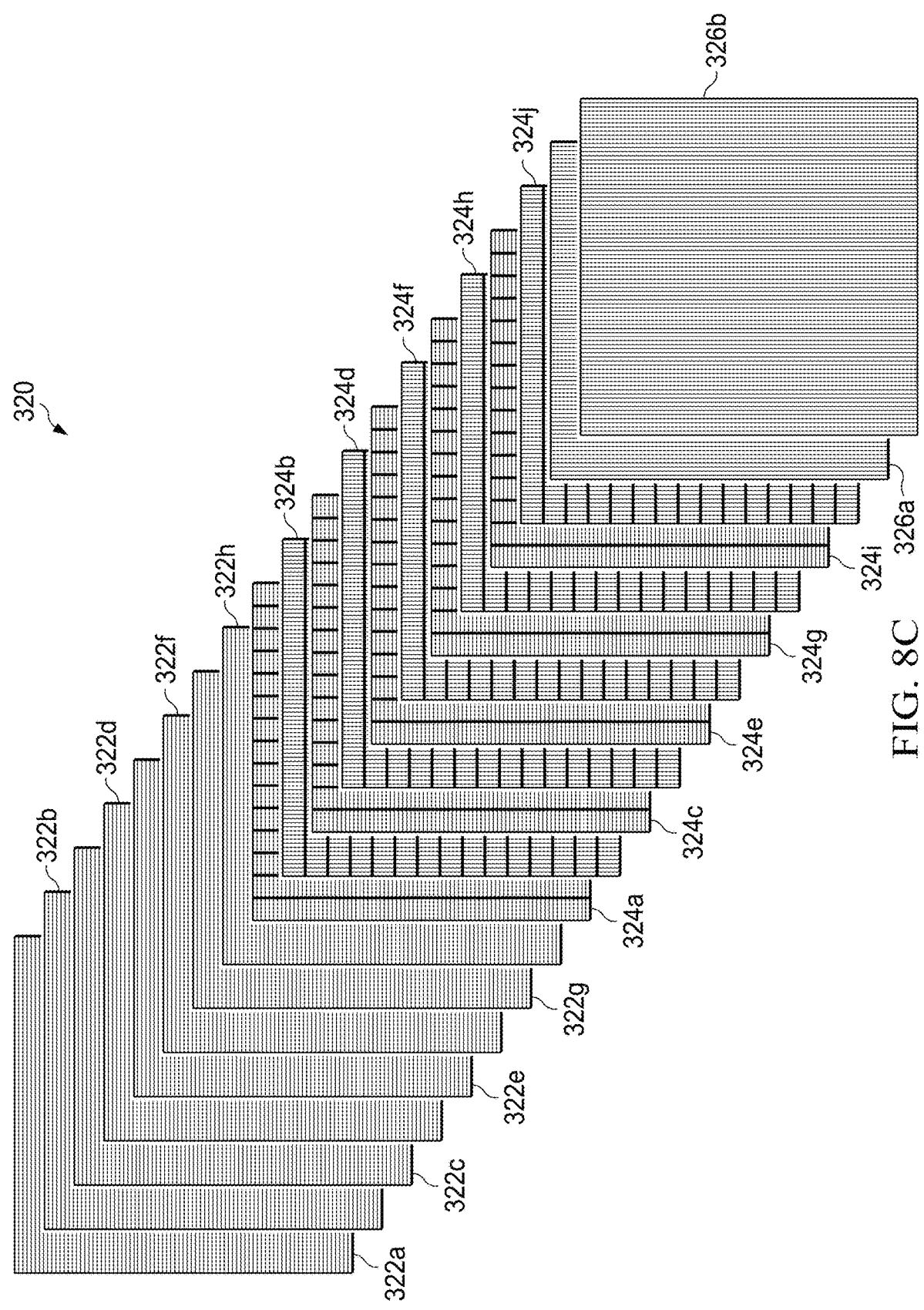

In a further example, referring to FIG. 8C in the drawings, an exploded or layup view of a textile substrate 320 is depicted. Textile substrate 320 includes a first series of non-ripstop plies 322*a*-322 h with a series of ripstop plies 324*a*-324*j* positioned exteriorly thereof and with a second series of non-ripstop plies 326*a*, 326*b* positioned exteriorly thereof. In the illustrated embodiment, ripstop plies 324*a*-324*j* are adjacent plies that have an off-axis orientation and more particularly a cross ply orientation. Ripstop plies are nonuniformly distributed within textile substrate 320 and are biased toward the outboard portion of textile substrate 320. Ripstop plies 324*a*-324*j* have a 1:1 ratio with non-ripstop plies 322*a*-322*h*, 326*a*, 326*b*. In addition, the first series of non-ripstop plies 322*a*-322 h may be formed from a first type of unidirectional fiber such as ultra-high molecular weight polyethylene fibers while the second series of non-ripstop plies 326*a*, 326*b* may be formed from a second type of unidirectional fiber such as para-aramid fibers. Such an arrangement has the benefit of a high melting point material as the outer plies, an enhanced tear resistance material as in middle plies and a high energy absorption material as the inner plies. Even though the textile substrates of the present embodiments include ripstop plies and non-ripstop plies in particular ratios, it should be understood by those having ordinary skill in the art that textile substrates of the present disclosure could have other ratios of ripstop plies to non-ripstop plies including ratios such as 1:5, 2:9, 1:4, 2:7, 1:3, 2:5, 1:2, 2:3, 5:4, 3:2, 2:1, 5:2, 3:1, 7:2, 4:1, 9:2, 5:1 or other desired ratio.

Figure 9:
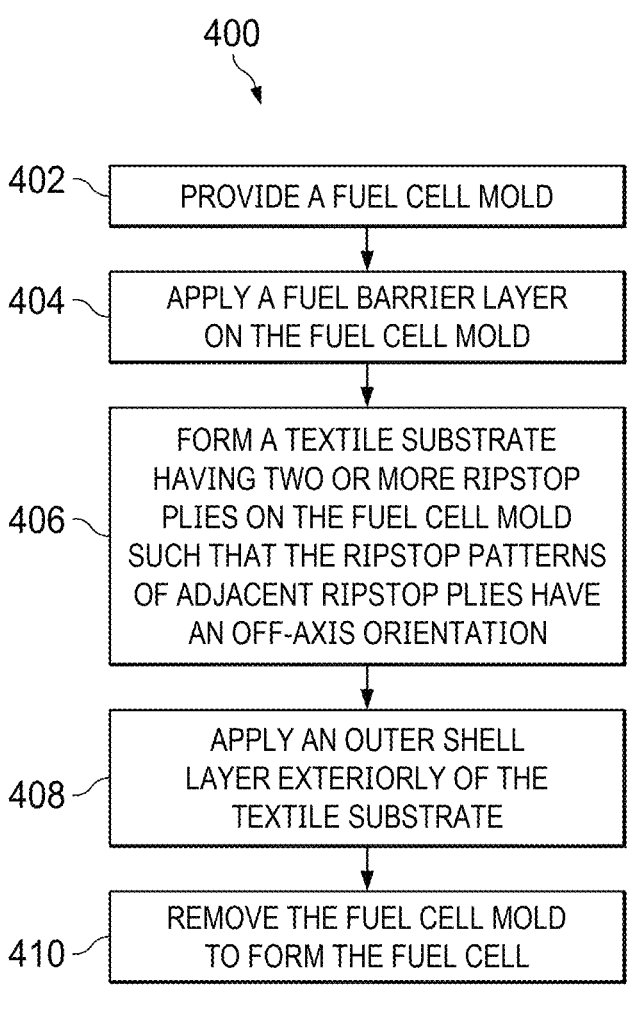
FIG. 9 is a flowchart of a method for manufacturing tear resistant fuel cells in accordance with embodiments of the present disclosure.

Referring to FIG. 9 in the drawings, a method for manufacturing tear resistance fuel cells for aircraft is depicted. Method 400 includes providing a fuel cell mold (step 402). Next, method 400 includes applying a fuel barrier layer on the fuel cell mold (step 404). Method 400 also includes forming a textile substrate having two or more ripstop plies on the fuel cell mold such that the ripstop patterns of adjacent ripstop plies have an off-axis orientation (step 406). Next, method 400 includes applying an outer shell layer exteriorly of the textile substrate (step 408) and removing the fuel cell mold to form the fuel cell (step 410).

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. For example, numerous combinations of the features disclosed herein will be apparent to persons skilled in the art including the combining of features described in different and diverse embodiments, implementations, contexts, applications and/ or figures. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A fuel cell for an aircraft, the fuel cell comprising:
a textile substrate having a plurality of unidirectional textile plies that are bonded together; and
an outer shell layer positioned exteriorly of the textile substrate;
wherein the plurality of unidirectional textile plies includes first and second ripstop plies each having a yarn coupled thereto in a ripstop pattern; and
wherein the ripstop pattern of the first ripstop ply has an off-axis orientation relative to the ripstop pattern of the second ripstop ply.

2. The fuel cell as recited in claim 1, wherein, the plurality of unidirectional textile plies includes between four and twenty unidirectional textile plies.

3. The fuel cell as recited in claim 1, wherein, the unidirectional textile plies further comprise ultra-high molecular weight polyethylene fibers.

4. The fuel cell as recited in claim 1, wherein, the unidirectional textile plies further comprise para-aramid fibers.

5. The fuel cell as recited in claim 1, wherein, the unidirectional textile plies further comprise unidirectional laminate plies.

6. The fuel cell as recited in claim 5, wherein, each of the unidirectional laminate plies further comprises a plurality of layers of unidirectional material positioned in a cross-ply orientation.

7. The fuel cell as recited in claim 1, wherein, the outer shell layer further comprises an elastomeric material.

8. The fuel cell as recited in claim 1, further comprising a fuel barrier layer positioned interiorly of the textile substrate.

9. The fuel cell as recited in claim 1, wherein, the yarn further comprises a high tenacity yarn.

10. The fuel cell as recited in claim 9, wherein, the high tenacity yarn further comprises ultra-high molecular weight polyethylene fibers.

11. The fuel cell as recited in claim 1, wherein, the ripstop pattern further comprises a parallel linear pattern.

12. The fuel cell as recited in claim 1, wherein, the yarn is stitched onto a surface of each ripstop ply to form the ripstop pattern.

13. The fuel cell as recited in claim 1, wherein, the first and second ripstop plies are adjacent plies.

14. The fuel cell as recited in claim 1, wherein, the first and second ripstop plies are nonadjacent plies.

15. The fuel cell as recited in claim 1, wherein, the ripstop pattern of the first ripstop ply has a cross-ply orientation relative to the ripstop pattern of the second ripstop ply.

16. The fuel cell as recited in claim 1, wherein, the plurality of unidirectional textile plies includes a plurality of ripstop plies in a range between two and ten ripstop plies including the first and second ripstop plies.

17. The fuel cell as recited in claim 16, wherein, the ripstop plies are distributed uniformly within the textile substrate.

18. The fuel cell as recited in claim 16, wherein, the ripstop plies are distributed nonuniformly within the textile substrate.

19. The fuel cell as recited in claim 18, wherein, the ripstop plies are biased toward an outboard portion of the textile substrate.

20. An aircraft comprising:
an airframe; and
a fuel cell coupled to the airframe, the fuel cell comprising:
a textile substrate having a plurality of unidirectional textile plies that are bonded together; and
an outer shell layer positioned exteriorly of the textile substrate;
wherein, the plurality of unidirectional textile plies includes first and second ripstop plies each having a yarn coupled thereto in a ripstop pattern; and
wherein, the ripstop pattern of the first ripstop ply has an off-axis orientation relative to the ripstop pattern of the second ripstop ply.

* * * * *